(12) United States Patent
Shiomi

(10) Patent No.: US 10,497,333 B2
(45) Date of Patent: Dec. 3, 2019

(54) LIQUID CRYSTAL DISPLAY

(71) Applicant: SHARP KABUSHIKI KAISHA, Sakai, Osaka (JP)

(72) Inventor: Makoto Shiomi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/575,493

(22) PCT Filed: May 18, 2016

(86) PCT No.: PCT/JP2016/064716
§ 371 (c)(1),
(2) Date: Nov. 20, 2017

(87) PCT Pub. No.: WO2016/190185
PCT Pub. Date: Dec. 1, 2016

(65) Prior Publication Data
US 2018/0158430 A1 Jun. 7, 2018

(30) Foreign Application Priority Data

May 22, 2015 (JP) ................................. 2015-104772

(51) Int. Cl.
*G09G 3/36* (2006.01)
*G02F 1/1343* (2006.01)

(52) U.S. Cl.
CPC ......... *G09G 3/3696* (2013.01); *G02F 1/1343* (2013.01)

(58) Field of Classification Search
CPC .. G09G 3/36; G09G 3/20; G02F 1/133; G09F 9/00; G09F 9/30
See application file for complete search history.

(56) References Cited

U.S. PATENT DOCUMENTS

| | | | | |
|---|---|---|---|---|
| 2003/0122761 A1* | 7/2003 | Hong | ................ | G09G 3/2011 345/89 |
| 2006/0114205 A1* | 6/2006 | Shen | ................ | G09G 3/3688 345/88 |
| 2008/0198118 A1* | 8/2008 | Choi | ................ | G09G 3/3648 345/89 |
| 2013/0201166 A1* | 8/2013 | Wang | ................ | G09G 3/18 345/204 |

(Continued)

FOREIGN PATENT DOCUMENTS

| | | |
|---|---|---|
| JP | 2007-047525 A | 2/2007 |
| JP | 4610440 B2 | 1/2011 |
| WO | 2012/157728 A1 | 11/2012 |

*Primary Examiner* — Pegeman Karimi
(74) *Attorney, Agent, or Firm* — ScienBiziP, P.C.

(57) ABSTRACT

A liquid crystal display includes: a display section including first and second areas (ARa and ARb); a first driver substrate (Fa) for the first area; a second driver substrate (Fb) for the second area; a first-driver-substrate-voltage generating circuit (Pa) that supplies a drive voltage to a first voltage input terminal (xa1) of the first driver substrate; a second-driver-substrate-voltage generating circuit (Pb) that supplies a drive voltage to a second voltage input terminal (xb1) of the second driver substrate; and at least one switch (a1 and B1) that electrically connects or separates the first and second voltage input terminals (xa1 and xb1). In this configuration, the liquid crystal display has restrained luminance difference (luminance disparity) between the areas.

19 Claims, 8 Drawing Sheets

(56) References Cited

U.S. PATENT DOCUMENTS

| | | | |
|---|---|---|---|
| 2015/0145843 A1* | 5/2015 | Park | G09G 3/20 345/209 |
| 2015/0187321 A1* | 7/2015 | Kim | G09G 3/3696 345/87 |
| 2015/0310827 A1* | 10/2015 | Song | G09G 3/2022 345/690 |

* cited by examiner

LIQUID CRYSTAL DISPLAY

TECHNICAL FIELD

The present invention relates to liquid crystal displays.

BACKGROUND ART

Patent Literature 1 discloses a liquid crystal display in which: there is provided a plurality of driver substrates for a plurality of areas of a display section; and drive voltages are supplied individually to these driver substrates.

CITATION LIST

Patent Literature

Patent Literature 1: PCT International Application Publication, No. WO2012/157728 (Publication Date: Nov. 22, 2012)

SUMMARY OF INVENTION

Technical Problem

The liquid crystal display disclosed in Patent Literature 1 has a problem that luminance difference (luminance disparity) could occur between areas due to a discrepancy between the drive voltages supplied individually to the driver substrates.

Solution to Problem

The liquid crystal display in accordance with the present invention includes: a display section including first and second areas; a first driver substrate for the first area; a second driver substrate for the second area; a first-driver-substrate-voltage generating circuit that supplies a drive voltage to a first voltage input terminal of the first driver substrate; a second-driver-substrate-voltage generating circuit that supplies a drive voltage to a second voltage input terminal of the second driver substrate; and at least one switch that electrically connects or separates the first and second voltage input terminals.

Advantageous Effects of Invention

The present invention restrains luminance difference (luminance disparity) between areas in a liquid crystal display in which there is provided a plurality of driver substrates for a plurality of areas of a display section.

DESCRIPTION OF EMBODIMENTS

Embodiment 1

Figure 1:
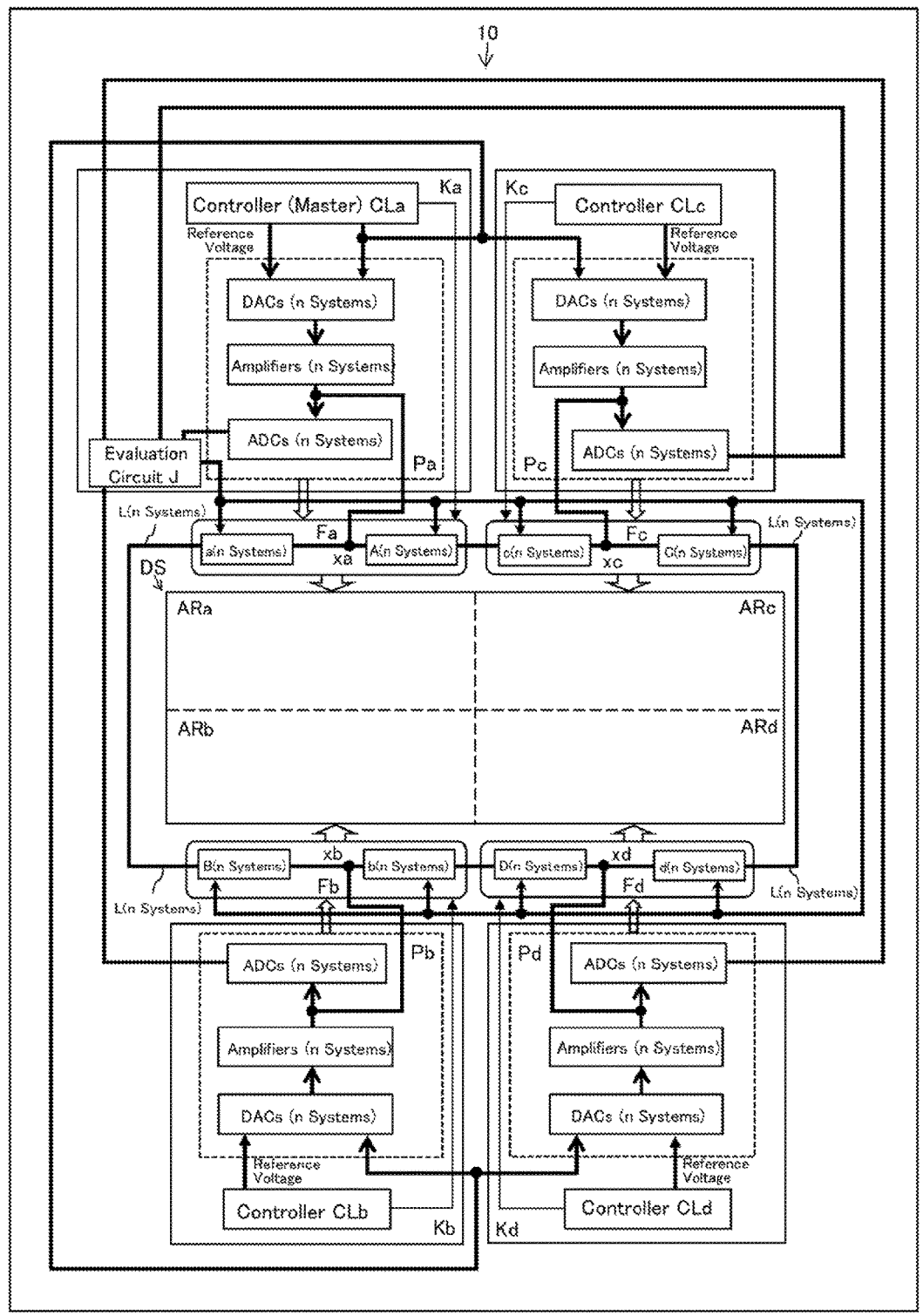
FIG. 1 is a block diagram of a liquid crystal display in accordance with Embodiment 1.

FIG. 1 is a block diagram of a liquid crystal display in accordance with Embodiment 1. As shown in FIG. 1, the liquid crystal display 10 includes: a display section DS including an area ARa, an area ARb vertically adjacent to the area ARa, an area ARc horizontally adjacent to the area ARa, and an area ARd vertically adjacent to the area ARc and also horizontally adjacent to the area ARb; four driver substrates Fa, Fb, Fc, and Fd associated respectively with the areas ARa to ARd; and four control boards Ka, Kb, Kc, and Kd controlling these driver substrates. The display section DS includes a liquid crystal panel of, for example, an "8K4K" resolution of approximately 8,000 picture elements in the horizontal direction, in which scan signal lines extend, times approximately 4,000 picture elements in the vertical direction, in which data signal lines extend (i.e., approximately 4,000×approximately 2,000 per area).

Figure 2:
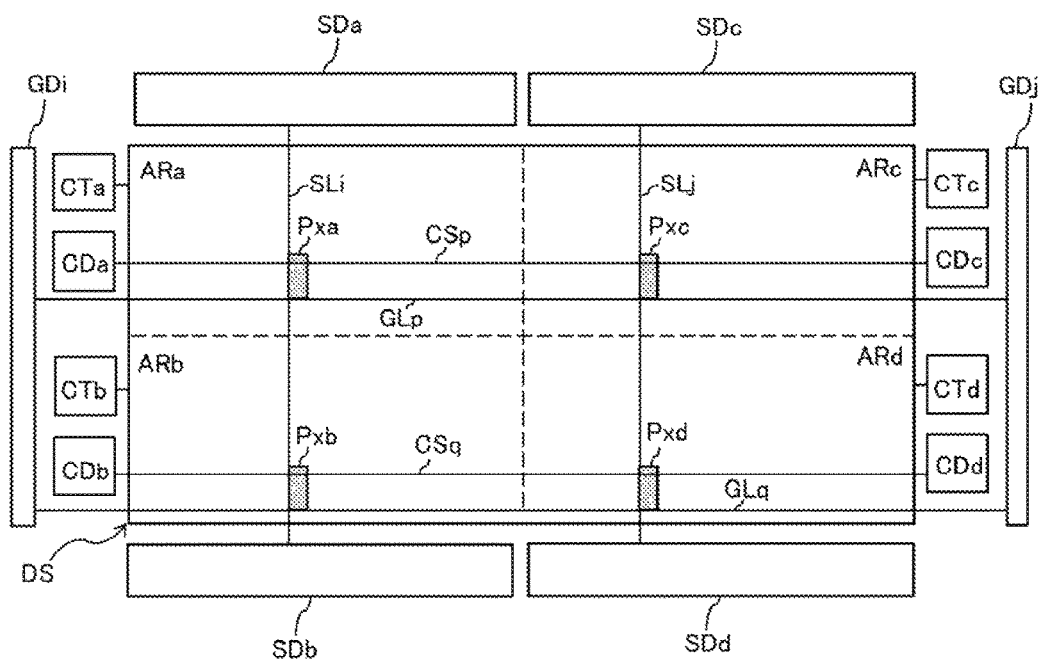
FIG. 2 is a block diagram of drivers in accordance with Embodiment 1.

FIG. 2 is a block diagram of the display section and the drivers for driving the display section. As shown in FIG. 2, in the display section DS, the area ARa includes a pixel Pxa, the area ARb includes a pixel Pxb, the area ARc includes a pixel Pxc, and the area ARd includes a pixel Pxd. The pixel Pxa has a pixel electrode (not shown) that is connected to a data signal line SLi and a scan signal line GLp via respective transistors (not shown) and that also forms capacitors in combination with a capacitor line CSp and a common electrode (not shown). The pixel Pxb has a pixel electrode (not shown) that is connected to the data signal line SLi and a scan signal line GLq via respective transistors (not shown) and that also forms capacitors combination with a capacitor line CSq and a common electrode (not shown). The pixel Pxc has a pixel electrode (not shown) that is connected to a data signal line SLj and the scan signal line GLp via respective transistors (not shown) and that also forms capacitors in combination with the capacitor line CSp and a common electrode (not shown). The pixel Pxd has a pixel electrode (not shown) that is connected to the data signal line SLj and the scan signal line GLq via respective transistors (not shown) and that also forms capacitors in combination with the capacitor line CSq and a common electrode (not shown). These transistors may be composed of an indium-gallium-zinc-oxide semiconductor, for example.

An end of the data signal line SLi is connected to a source driver SDa, and the other end is connected to a source driver SDb. An end of the data signal line Slj is connected to a source driver SDc, and the other end is connected to a source driver SDd. An end of each scan signal line GLp and GLq is connected to a gate driver GDi, and the other end is connected to a gate driver GDj. An end of the capacitor line CSp is connected to a CS driver CDa, and the other end is connected to a CS driver CDc. An end of the capacitor line CSq is connected to a CS driver CDb, and the other end is connected to a CS driver CDd. The common electrode (i.e., counter electrode) that corresponds to the area ARa is connected to a VCOM terminal CTa. The common electrode (i.e., counter electrode) that corresponds to the area ARb is connected to a VCOM terminal CTb. The common electrode (i.e., counter electrode) that corresponds to the area ARc is connected to a VCOM terminal CTc. The common electrode (i.e., counter electrode) that corresponds to the area ARd is connected to a VCOM terminal CTd.

In Embodiment 1, for example, the source driver SDa, the gate driver GDi, the CS driver CDa, and the VCOM terminal CTa, all shown in FIG. 2, are provided on the driver substrate Fa shown in FIG. 1; the source driver SDb, the CS driver CDb, and the VCOM terminal CTb, all shown in FIG. 2, are provided on the driver substrate Fb shown in FIG. 1; the source driver SDc, the gate driver GDj, the CS driver CDc, and the VCOM terminal CTc, all shown in FIG. 2, are provided on the driver substrate Fe shown in FIG. 1; and the source driver SDd, the CS driver CDd, and the VCOM terminal CTd, all shown in FIG. 2, are provided on the driver substrate Fd shown in FIG. 1.

Throughout the following description, "n" is a natural number greater than 1, and required drive voltage (power supply) systems are referred to as first to n-th systems (a total of n systems). For example, 4 to 20 systems are assigned for the voltages inputted to the source drivers, 1 or 2 systems are assigned for the voltages inputted to the CS drivers, and a single system is assigned for the voltage inputted to the VCOM terminals.

The control board Ka includes: a controller CLa controlling the driver substrate Fa; n systems of digital-to-analog conversion circuits (DACs), amplifiers, and analog-to-digital conversion circuits (ADCs), each system including a DAC, an amplifier, and an ADC; and an evaluation circuit J. These DACs, amplifiers, and ADCs constitute a voltage generating circuit Pa (i.e., first-driver-substrate-voltage generating circuit) for the driver substrate Fa.

The control board Kb includes: a controller CLb controlling the driver substrate Fb and; n systems of DACs, amplifiers, and ADCs, each system including a DAC, an amplifier, and an ADC. These DACs, amplifiers, and ADCs constitute a voltage generating circuit Pb (i.e., second-driver-substrate-voltage generating circuit) for the driver substrate Fb.

The control board Kc includes: a controller CLc controlling the driver substrate Fc and; n systems of DACs, amplifiers, and ADCs, each system including a DAC, an amplifier, and an ADC. These DACs, amplifiers, and ADCs constitute a voltage generating circuit Pc for the driver substrate Fc.

The control board Kd includes: a controller CLd controlling the driver substrate Fd and; n systems of DACs, amplifiers, and ADCs, each system including a DAC, an amplifier, and an ADC. These DACs, amplifiers, and ADCs constitute a voltage generating circuit Pd for the driver substrate Fd.

The driver substrate Fa includes: n systems of voltage input terminals xa, switches a, and switches A, each system including a voltage input terminal xa, a switch a, and a switch A. In each system, the voltage input terminal xa is connected to the output of the amplifier of the voltage generating circuit Pa.

The driver substrate Fb includes: n systems of voltage input terminals xb, switches B, and switches b, each system including a voltage input terminal xb, a switch b, and a switch B. In each system, the voltage input terminal xb is connected to the output of the amplifier of the voltage generating circuit Pb.

The driver substrate Fc includes: n systems of voltage input terminals xc, switches c, and switches C, each system including a voltage input terminal xc, a switch c, and a switch C. In each system, the voltage input terminal xc is connected to the output of the amplifier of the voltage generating circuit Pc.

The driver substrate Fd includes: n systems of voltage input terminals xd, switches D, and switches d, each system including a voltage input terminal xd, a switch d, and a switch D. In each system, the voltage input terminal xd is connected to the output of the amplifier of the voltage generating circuit Pd.

In each system, the switch a is connected to the switch A via the voltage input terminal xa. In each system, the n-systems switch B is connected to the switch b via the voltage input terminal xb. In each system, the switch c is connected to the switch C via the voltage input terminal xc. In each system, the n-systems switch D is connected to the switch d via the voltage input terminal xd.

In each system, the switch A is connected to the switch c via a voltage link wire L. In each system, the switch C is connected to the switch d via a voltage link wire L. In each system, the switch D is connected to the switch b via a voltage link wire L. In each system, the switch B is connected to the switch a via a voltage link wire L.

In each of the four control boards Ka to Kd. the n DACs generate n drive voltages (voltages for use in the drivers in FIG. 2 and input voltages for the VCOM terminals) using n sets of reference voltages fed from the controller on the associated control board and digital data fed from the controller CLa (i.e., master controller). These n drive voltages are inputted to the evaluation circuit J as a digital signal (evaluation data) via the respective amplifiers and ADCs. In this embodiment, to reduce performance discrepancies between the control boards, there may be provided a digital correction circuit that corrects the digital data fed from the controller CLa before the digital data is inputted to the respective DACs.

The evaluation circuit J evaluates the inputs from the four control boards for each system. Only if every one of the n systems satisfies conditions determined for that system, the evaluation circuit J transmits an ON control signal to the associated switches (a, A, b, B, c, C, d, and D) provided on the four driver substrates to simultaneously turn on (i.e., close, or turn into conducting state) these switches.

Specifically, for the m-th system (m=1 to n), the evaluation circuit J performs a voltage value evaluation in which it is evaluated whether or not each of a voltage value Vma represented by a digital signal from the control board Ka, a voltage value Vmb represented by a digital signal from the control board Kb, a voltage value Vmc represented by a digital signal from the control board Kc, and a voltage value Vmd represented by a digital signal from the control board Kd exceeds a threshold value Vmt for the m-th system and also performs a voltage difference evaluation in which it is evaluated whether or not each of the difference between the voltage value Vma and the voltage value Vmb, the difference between the voltage value Vma and the voltage value Vmc, the difference between the voltage value Vmb and the voltage value Vmd, and the difference between the voltage value Vmc and the voltage value Vmd is less than or equal to a reference value Vms for the m-th system. If these voltage value and voltage difference evaluations both produce an affirmative result, the evaluation circuit J evaluates that the m-th system is in a safe state, in other words, evaluates that: the m-th systems in the four voltage generating circuits Pa to Pd have started up normally; and excess current and other malfunctions are unlikely to occur when the voltage input terminals for the m-th system (a total of four voltage input terminals) provided on the four driver substrates Fa to Fd are mutually connected via the voltage link wires L for the m-th system.

Only if all the first to n-th systems are evaluated to be in a safe state, the evaluation circuit J transmits an ON control signal. As a result, in each of the first to n-th systems, the four voltage input terminals of the driver substrates Fa to Fd are connected to each other via the voltage link wires L, so that the driver substrates Fa to Fd can share a common drive voltage.

As detailed above, in each of the first to nth systems, Embodiment 1 provides a common drive voltage for the four driver substrates, while ensuring safety, specifically, avoiding the risk of malfunction that could be caused by an unexpected voltage difference between the mutually connected driver substrates (a serious drive voltage difference between driver substrates for the same system). Embodiment 1 hence restrains luminance difference (luminance disparity) between the areas.

In addition, each control board generates a drive voltage based on the digital data fed from the control board Ka (i.e., master control board), and these drive voltages are inputted to the evaluation circuit as digital data. Therefore, Embodiment 1 eliminates many potential errors attributable to transmission, thereby improving safety.

Additionally, each driver substrate is provided with two sets of n switches located to sandwich the n voltage input terminals. Embodiment 1 therefore allows for improving safety through redundancy.

The switches on the driver substrates Fa to Fd are preferably field effect transistors (FETs). The FET boasts small footprint, easy controllability, low on-resistance, and high off-resistance.

In the evaluation circuit J, the reference value for the voltage difference evaluation is set to, for example, less than or equal to 2%, preferably less than or equal to 1%, of the reference voltage, and this reference value is changeable (adjustable). The voltage value evaluation is intended only to find serious voltage differences caused by obvious malfunctions such as a simple operation timing error and leak and suffices if the evaluation can find voltages roughly equal to a target value (in other words, the evaluation does not need to offer high precision). Specifically, variations of approximately ±10% the reference voltage are acceptable (and the evaluation produces an affirmative result).

The evaluation circuit J is preferably configured not to output the control signal regardless of the results of the voltage value and voltage difference evaluations if for the m-th system (m=1 to n), any of the voltage value Vma represented by a digital signal from the control board Ka, the voltage value Vmb represented by a digital signal from the control board Kb, the voltage value Vmc represented by a digital signal from the control board Kc, and the voltage value Vmd represented by a digital signal from the control board Kd exceeds an upper limit voltage or a lower limit voltage that is obtained based on the reference voltage. The upper and lower limit voltages are preferably written and stored in advance as data in the evaluation circuit J, but may be configured to load parameter values on power-on and set the parameters to these values.

In the description above, the evaluation circuit J evaluates, for the m-th system (m=1 to n), that the m-th system is in a safe state if the voltage value and voltage difference evaluations both produce an affirmative result. The evaluation circuit J is by no means limited to this configuration. Alternatively, the evaluation circuit J may be configured to perform only the voltage difference evaluation, for example, and if this evaluation produces an affirmative result, evaluate that the m-th system is in a safe state and if all the first to n-th systems are evaluated to be in a safe state, transmit a control signal.

As another alternative, the voltage value evaluation may be replaced by a process in which it is evaluated whether or not the voltage value represented by a digital signal from a system for which a relatively high voltage is presumed and the voltage value represented by a digital signal from a system for which a relatively low voltage is presumed have a presumed magnitude relation.

The evaluation circuit J is also preferably configured to alert the user to a malfunction if the switches (a, A, b, B, c, C, d, and D) are not turned on for a predetermined time after power-on. This configuration allows for alerting the user to a possible breakdown that could occur if the switches are turned on to share a common drive voltage, thereby attempting to address ongoing luminance disparity or another display malfunction caused by lack of sharing of a common drive voltage, when the liquid crystal display is being used in a normal display state, but the switches remain off (the voltage difference evaluation produces no affirmative result) for a continuous period and further allows for prompting the user to make adjustments.

Embodiment 2

Figure 3:
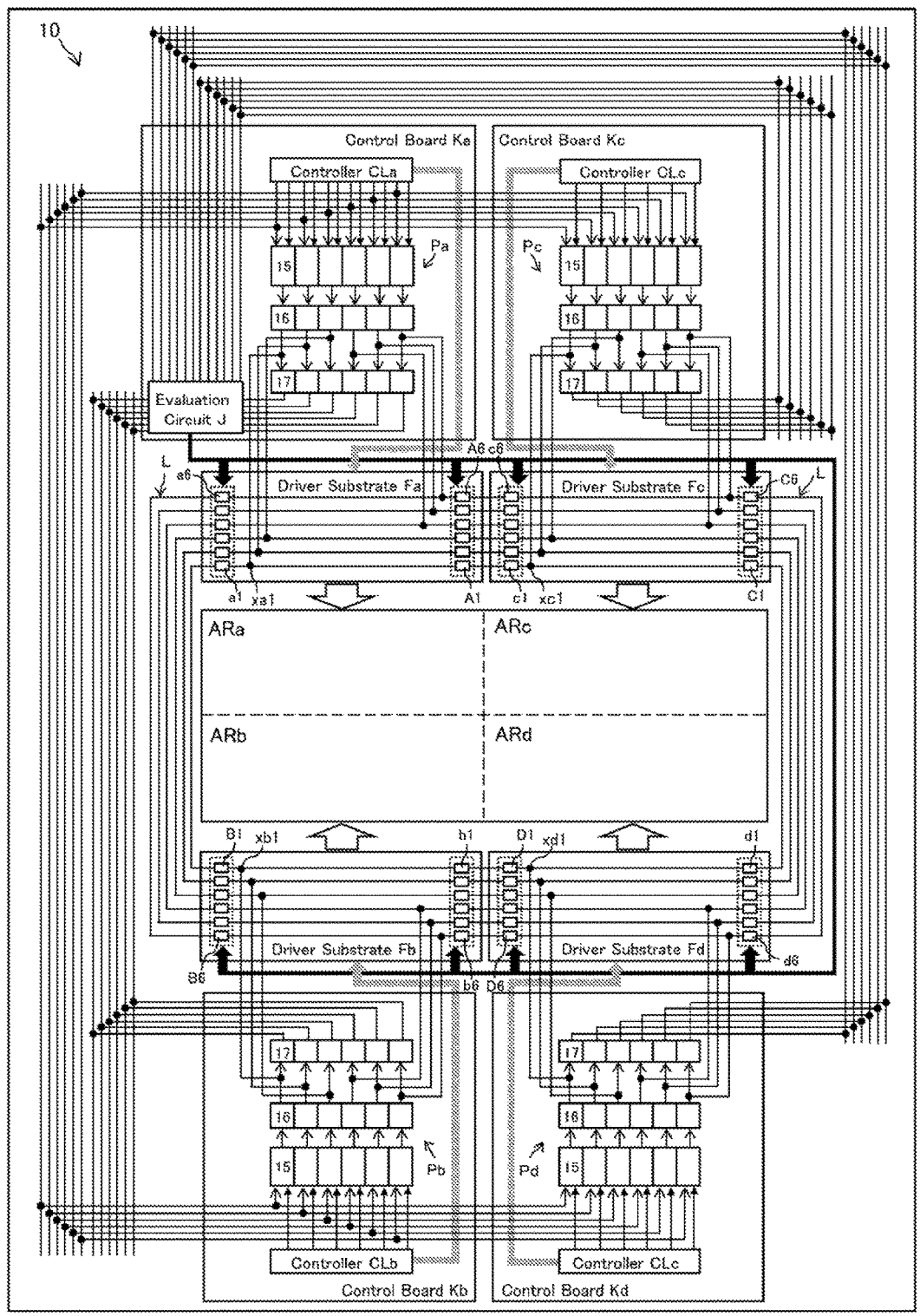
FIG. 3 is a schematic diagram of a configuration of a liquid crystal display in accordance with Embodiment 2.

FIG. 3 shows a configuration of a liquid crystal display in accordance with Embodiment 2. In the liquid crystal display 10 in FIG. 3 the first to fourth systems are assigned for the voltages inputted to the source drivers, the fifth system is assigned for the voltage inputted to the CS drivers, and the sixth system is assigned for the voltage inputted to the VCOM terminals. For example, the first system supplies a positive voltage corresponding to a maximum gray level, the second system supplies a positive voltage corresponding to a minimum gray level, the third system supplies a negative voltage corresponding to the minimum gray level, the fourth system supplies a negative voltage corresponding to the maximum gray level, the fifth system supplies a common electrode voltage (Vcom), and the sixth system supplies a capacitor line voltage (CS voltage).

The control board Ka includes: a controller CLa controlling the driver substrate Fa; 6 systems of digital-to-analog conversion circuits (DACs) 15, amplifiers 16, and analog-to-digital conversion circuits (ADCs) 17 each system including a DAC 15, an amplifier 16, and an ADC 17; and an evaluation circuit J. These DACs 15, amplifiers 16, and ADCs 17 constitute a voltage generating circuit Pa (i.e., first-driver-substrate-voltage generating circuit) for the driver substrate Fa.

The control board Kb includes: a controller CLb controlling the driver substrate Fb; and 6 systems of DACs 15, amplifiers 16, and ADCs 17, each system including a DAC 15, an amplifier 16, and an ADC 17. These DACs 15, amplifiers 16, and ADCs 17 constitute a voltage generating circuit Pb (i.e., second-driver-substrate-voltage generating circuit) for the driver substrate Fb.

The control board Kc includes: a controller CLc controlling the driver substrate Fc; and 6 systems of DACs 15, amplifiers 16, and ADCs 17, each system including a DAC 15, an amplifier 16, and an ADC 17. These DACs 15, amplifiers 16, and ADCs 17 constitute a voltage generating circuit Pc for the driver substrate Fc.

The control board Kd includes: a controller ClA controlling the driver substrate Fd; and 6 systems of DACs 15, amplifiers 16, and ADCs 17, each system including a DAC 15, an amplifier 16, and an ADC 17. These DACs 15, amplifiers 16, and ADCs 17 constitute a voltage generating circuit Pd for the driver substrate Fd.

The driver substrate Fa includes: 6 systems of first voltage input terminals, switches a1 to a6, and switches A1 to A6, each system including a first voltage input terminal and two switches. In each system, the voltage input terminal is connected to the outputs of the two associated switches of the voltage generating circuit Pa.

The driver substrate Fb includes: 6 systems of second voltage input terminals, switches B1 to B6, and switches b1 to b6, each system including a second voltage input terminal and two switches. In each system, the voltage input terminal is connected to the outputs of the two associated switches of the voltage generating circuit Pb.

The driver substrate Fc includes: 6 systems of third voltage input terminals, switches c1 to c6, and switches C1 to C6, each system including a third voltage input terminal and two switches. In each system, the voltage input terminal is connected to the outputs of the two associated switches of the voltage generating circuit Pc.

The driver substrate Fd includes: 6 systems of fourth voltage input terminals; switches D1 to D6, and switches d1 to d6, each system including a fourth voltage input terminal and two switches. In each system, the voltage input terminal is connected to the outputs of the two associated switches of the voltage generating circuit Pd.

In each system, the switch a1 to a6 is connected to the switch A1 to A6 via the first voltage input terminal. In each system, the switch B1 to B6 is connected to the switch b1 to b6 via the second voltage input terminal. In each system, the switch c1 to c6 is connected to the switch C1 to C6 via the third voltage input terminal. In each system, the switch D1 to D6 is connected to the switch d1 to d6 via the fourth voltage input terminal.

In the first system, a first voltage input terminal xa1 is connected to a second voltage input terminal xb1 via the switches a1 and B1; the first voltage input terminal xa1 is connected to a third voltage input terminal xc1 via the switches A1 and c1; the third voltage input terminal xc1 is connected to a fourth voltage input terminal xd1 via the switches C1 and d1; and the fourth voltage input terminal xd1 is connected to the second voltage input terminal xb1 via the switches D1 and b1.

In each of the four control boards Ka to Kd, the 6 DACs generate 6 drive voltages (voltages for use in the drivers in FIG. 2 and input voltages for the VCOM terminals) using 6 sets of reference voltages fed from the controller on the associated control board and digital data fed from the controller CLa (i.e., master controller). These 6 drive voltages are inputted to the evaluation circuit J as a digital signal (evaluation data) via the respective amplifiers and ADCs. There may be provided a digital correction circuit that corrects the digital data fed from the controller CLa before the digital data is inputted to the respective DACs.

The evaluation circuit J evaluates the inputs from the four control boards for each system. Only if every one of the 6 systems satisfies conditions determined for that system, the evaluation circuit J transmits a control signal to the associated switches (a1 to a6, A1 to A6, b1 to b6, B1 to B6, c1 to c6, C1 to C6, d1 to d6, and D1 to D6) provided on the four driver substrates to simultaneously turn on (i.e., close, or electrically connect the voltage input terminals of) these switches.

For the first system, the evaluation circuit J performs a voltage value evaluation in which it is evaluated whether or not each of a voltage value Va represented by a digital signal from the control board Ka, a voltage value Vb represented by a digital signal from the control board Kb, a voltage value Vc represented by a digital signal from the control board Kc, and a voltage value Vd represented by a digital signal from the control board Kd exceeds a threshold value Vt for the first system (a positive voltage corresponding to the maximum gray level) and also performs a voltage difference evaluation in which it is evaluated whether or not each of the difference between the voltage value Va and the voltage value Vb, the difference between the voltage value Va and the voltage value Vc, the difference between the voltage value Vb and the voltage value Vd, and the difference between the voltage value Vc and the voltage value Vd is less than or equal to a reference value Vs for the first system (a positive voltage corresponding to the maximum gray level). If these voltage value and voltage difference evaluations both produce an affirmative result, the evaluation circuit J evaluates that the first system is in a safe state, in other words, evaluates that: the first system in the four voltage generating circuits Pa to Pd has started up normally; and excess current and other malfunctions are unlikely to occur when the voltage input terminals (xa1, xb1, xc1, and xd1) for the first system provided on the four driver substrates Fa to Fd are mutually connected via the voltage link wires L for the first system.

Only if all the first to sixth systems are evaluated to be in a safe state, the evaluation circuit J transmits the control signal. As a result, in each of the first to sixth systems, the four voltage input terminals of the driver substrates Fa to Fd are connected to each other via the voltage link wires L, so that the driver substrates Fa to Fd can share a common drive voltage.

As detailed above, in each of the first to sixth systems, Embodiment 2 provides a common drive voltage for the four driver substrates, while ensuring safety. Embodiment 2 hence restrains luminance difference (luminance disparity) between the areas.

In addition, each control board generates a drive voltage based on the digital data fed front the control board Ka (i.e., master control board), and these drive voltages are inputted to the evaluation circuit as digital data. Therefore, Embodiment 2 eliminates many potential errors attributable to transmission, thereby improving safety.

Figure 4:
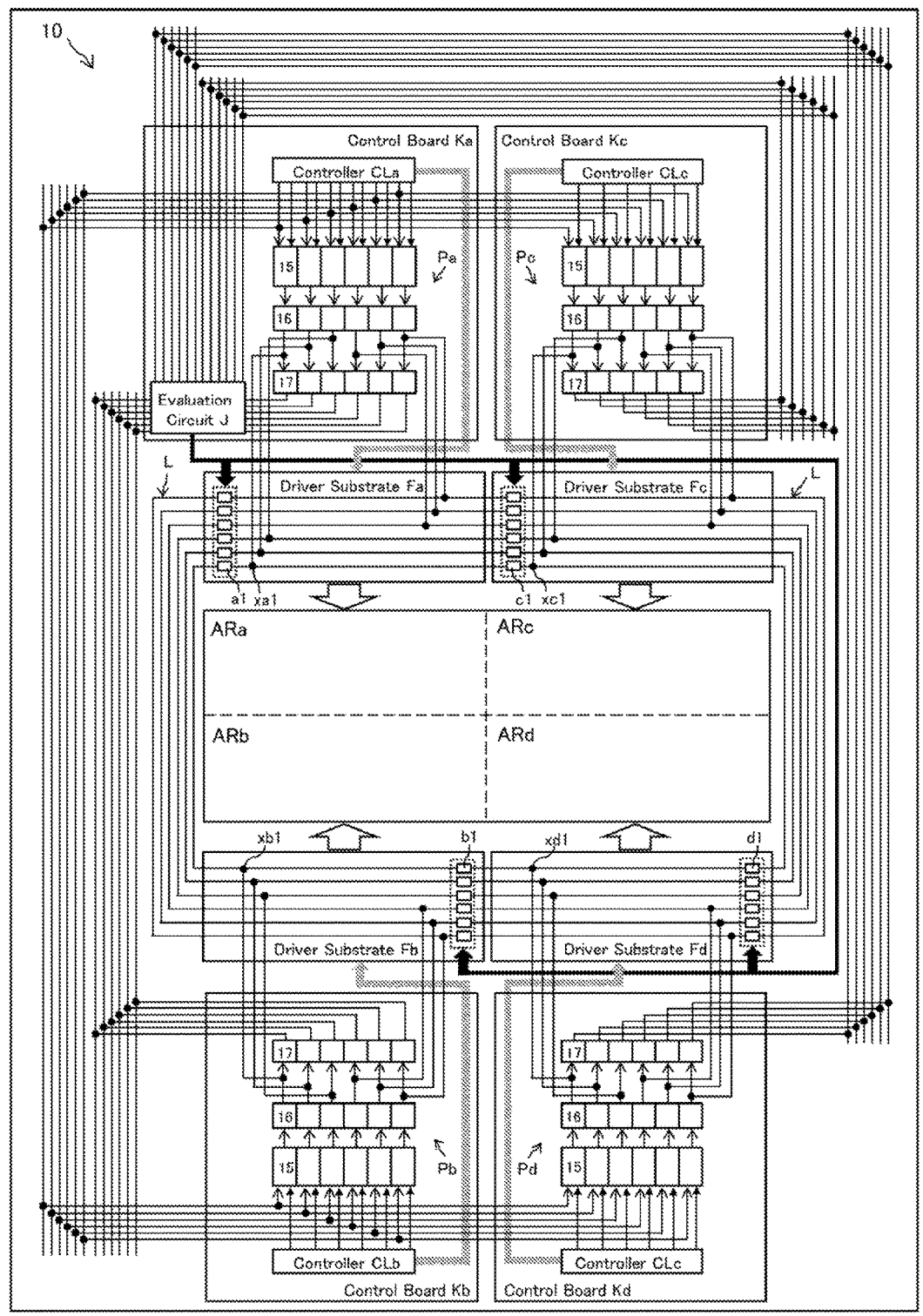
FIG. 4 is a schematic diagram of another configuration of the liquid crystal display in accordance with Embodiment 2.

Additionally, each driver substrate is provided with two sets of 6 switches located to sandwich the 6 voltage input terminals. Embodiment 2 therefore allows for improving safety through redundancy. Each driver substrate may be provided with a single set of 6 switches as shown in FIG. 4.

Figure 5:
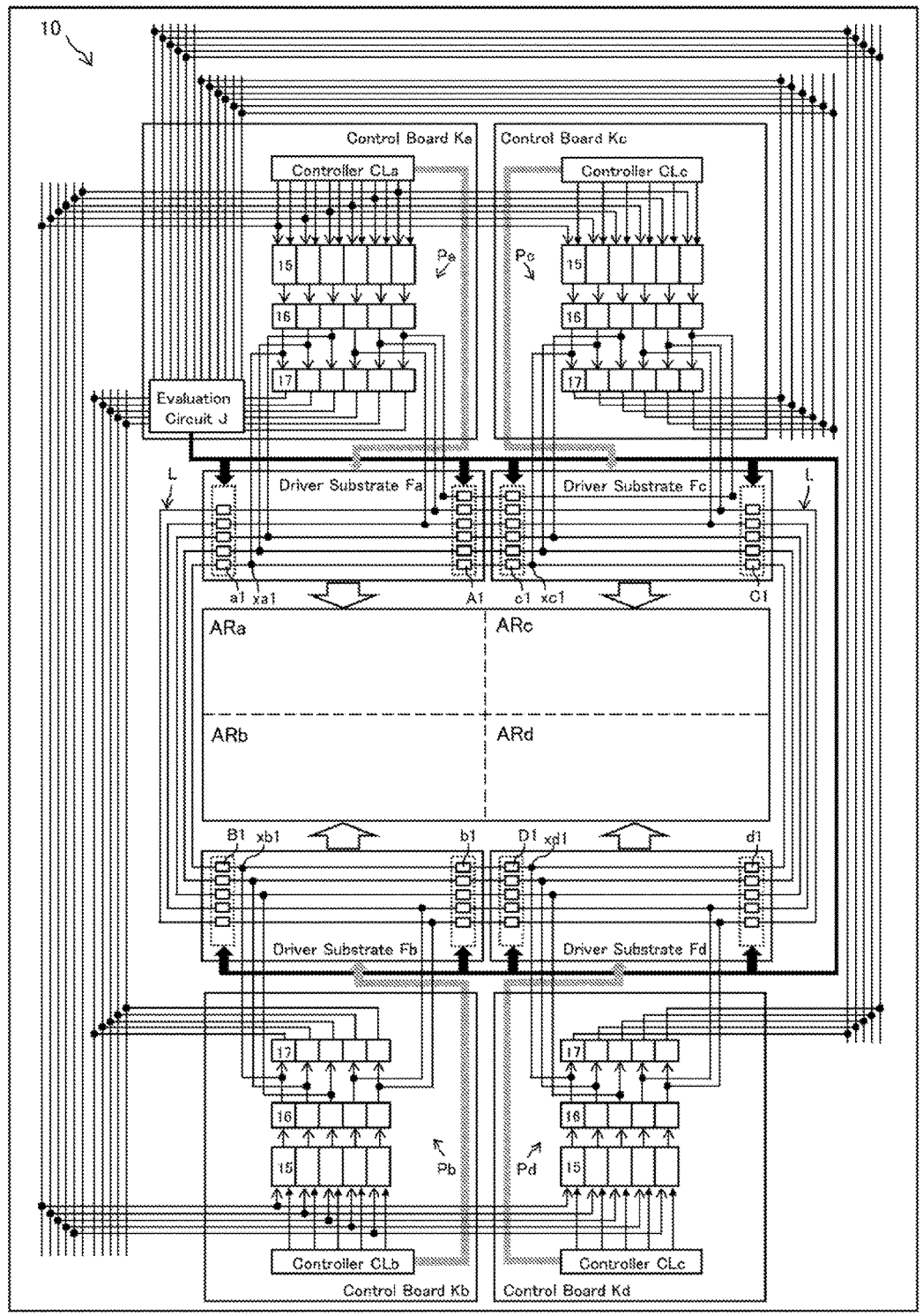
FIG. 5 is a schematic diagram of a further configuration of the liquid crystal display in accordance with Embodiment 2.

Furthermore, if the CS drivers CDa and CSb in FIG. 2 are integrated into the driver substrate Fa, and the CS drivers CDc and CSd are integrated into the driver substrate Fc, the driver substrates Fa and Fc alone may share a common drive voltage (CS voltage) for the sixth system as shown in FIG. 5.

Embodiment 3

In the foregoing embodiments, the liquid crystal display 10 includes the evaluation circuit J. The evaluation circuit J is by no means limited to this configuration. Alternatively, the evaluation circuit J may be replaced by a switching circuit H that transmits a control signal to the n switches (a, A, b, B, c, C, d, and D) in response to an input through a user input section U, to simultaneously turn on these switches, as shown in FIG. 6.

Figure 6:
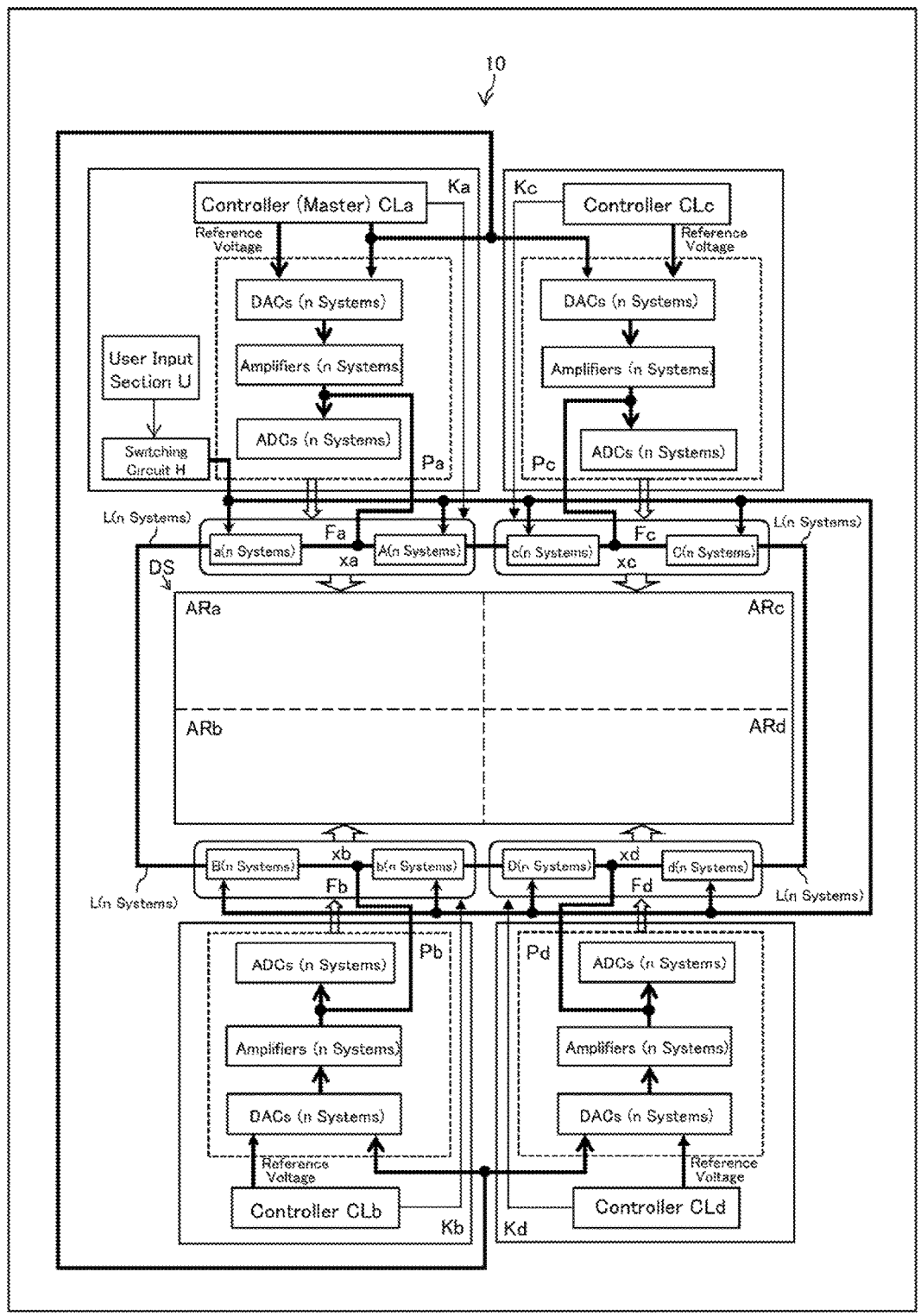
FIG. 6 is a block diagram of a liquid crystal display in accordance with Embodiment 3.

In the liquid crystal display in FIG. 6, the switches are turned on in response to an input that the user makes after the user identifies a predetermined initial display or an actual display with all the n switches (a, A, b, B, c, C, d, and D) being turned off.

The input made through the user input section U may be, for example, (1) an input for luminance disparity correction in a display adjustment menu ("correction turn-on input"). In enabling this input, a timer is preferably provided to permit a correction turn-on input only after a particular time has elapsed after power-on of the liquid crystal display, to ensure safety. Another example of the input made through the user input section U is (2) a user input for switching of channels or of signals. Note that (1) is preferred if the risk of malfunction that could be caused by an unexpected voltage difference between the mutually connected driver substrates is regarded as posing a more serious issue. It is also preferable for both cases (1) and (2) that the n switches be off (i.e., be open, or the voltage input terminals thereof be electrically separated from each other) on power-on and these settings be unchangeable.

Embodiment 4

Figure 7:
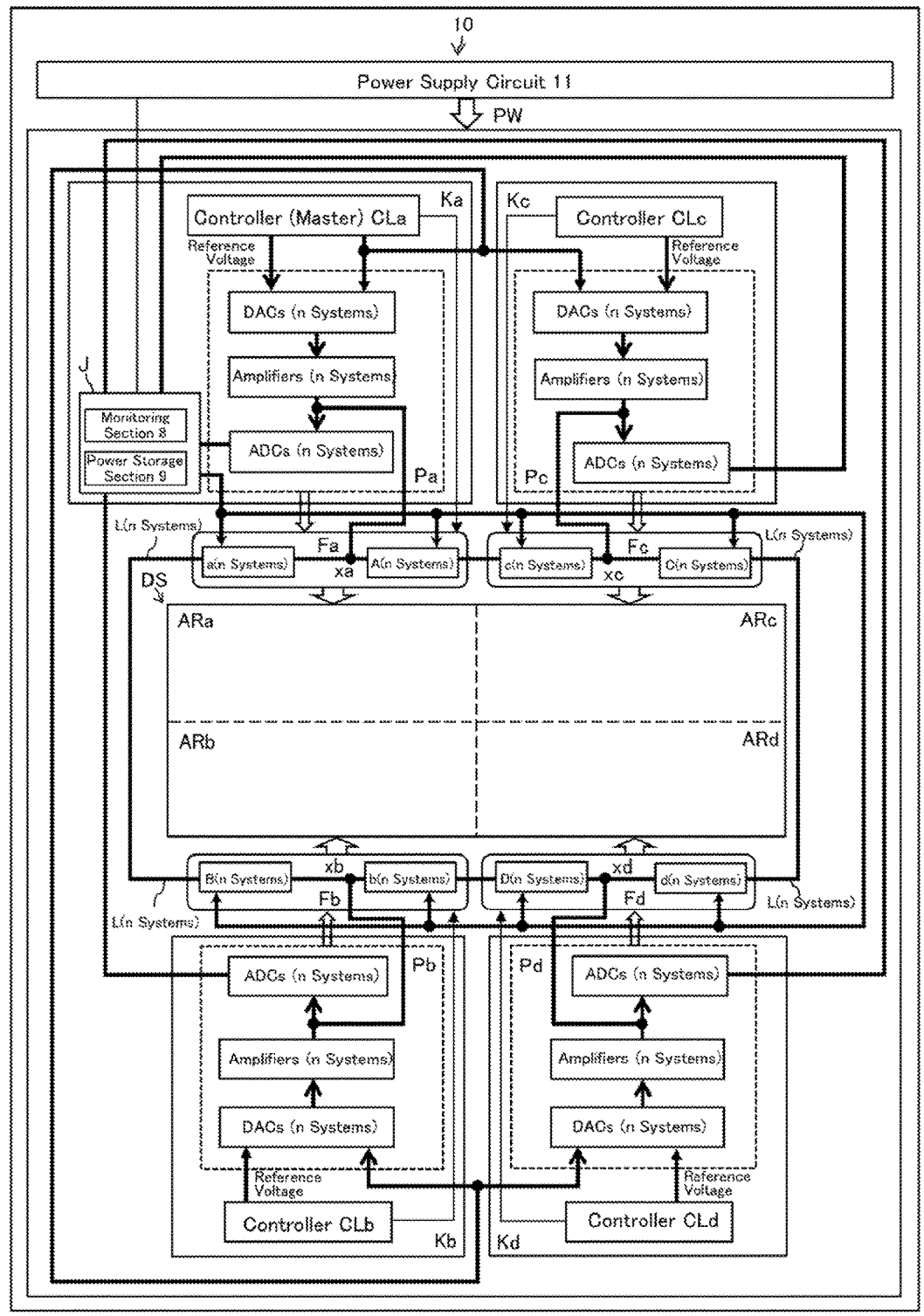
FIG. 7 is a block diagram of a configuration of a liquid crystal display in accordance with Embodiment 4.

In Embodiment 4, the liquid crystal display of Embodiment 1 is modified as shown in FIG. 7. Specifically, the liquid crystal display 10 in FIG. 7, which includes a power supply circuit 11, includes an evaluation circuit J that in turn includes: a monitoring section 8 monitoring a power supply voltage PW supplied from the power supply circuit 11; and a power storage section 9. If the power supply voltage PW exhibits an abnormality such as an instantaneous voltage drop or a power failure, the monitoring section 8 outputs a control signal that turns off (i.e., opens, or electrically separates the voltage input terminals of) the n switches by operating on an incoming power supply from the power storage section 9.

In this configuration, the risk of malfunction that could be caused by an unexpected voltage difference between the mutually connected driver substrates is reduced when the power supply voltage PW is abnormal. The configuration hence can end operation safely when the power supply malfunctions.

The power storage section 9 may be a capacitor-integrated circuit or a battery-mounted circuit. The power storage section 9 charges and discharges in normal operation and serves as an urgent power supply circuit for the monitoring section 8 when the power supply malfunctions.

Either one or both of the monitoring section 8 and the power storage section 9 may be provided outside the evaluation circuit J. When the display section DS (liquid crystal panel) includes transistors containing an oxide semiconductor (e.g., indium-gallium-zinc-oxide semiconductor), which possess excellent off-characteristics, there is often provided a power storage device, as a measure to prevent burning upon abnormal shutdown, so that the display section DS can continue to operate for a period to enable the electric charge of the pixels to be drawn out when the power supply is suddenly cut off. The functionality of the power storage section 9 may be delegated to such a power storage device.

Figure 8:
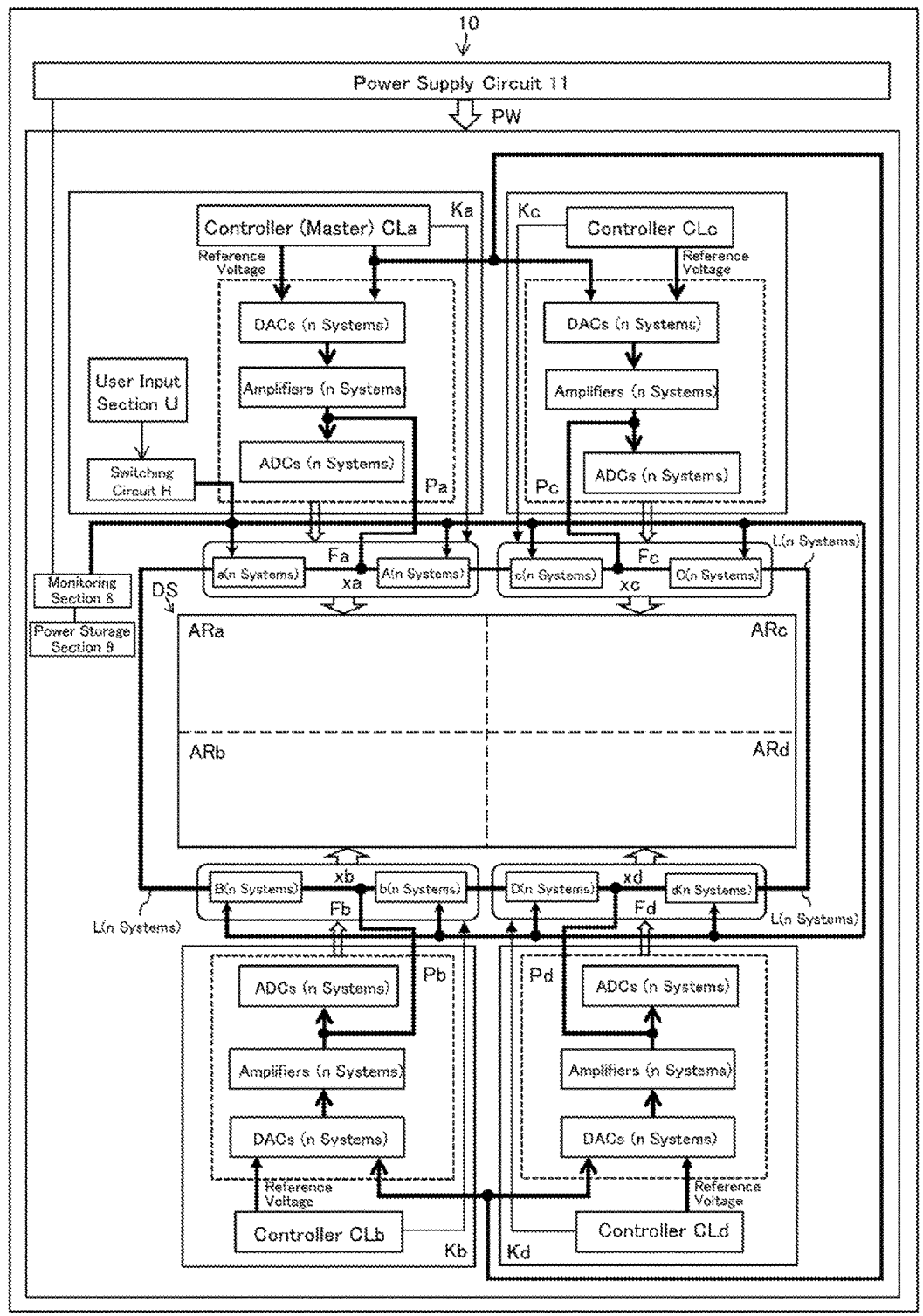
FIG. 8 is a block diagram of another configuration of the liquid crystal display in accordance with Embodiment 4.

The liquid crystal display of Embodiment 3 (FIG. 6) may be modified as shown in FIG. 8. The liquid crystal display 10 in FIG. 8, which includes the power supply circuit 11, includes: a monitoring section 8 monitoring a power supply voltage PW supplied from the power supply circuit 11; and a power storage section 9. If the power supply voltage PW exhibits an abnormality such as an instantaneous voltage drop or a power failure, the monitoring section 8 outputs a control signal that turns off the n switches by operating on an incoming power supply from the power storage section 9. The power storage section 9 charges and discharges in normal operation and serves as an urgent power supply circuit for the monitoring section 8 when the power supply malfunctions.

In this configuration, the risk of malfunction that could be caused by an unexpected voltage difference between the mutually connected driver substrates is reduced when the power supply voltage PW is abnormal. The configuration hence can end operation safely when the power supply malfunctions.

Overview of Invention

The present invention, in a first aspect thereof, is directed to a liquid crystal display including: a display section including first and second areas; a first driver substrate for the first area; a second driver substrate for the second area; a first-driver-substrate-voltage generating circuit that supplies a drive voltage to a first voltage input terminal of the first driver substrate; a second-driver-substrate-voltage generating circuit that supplies a drive voltage to a second voltage input terminal of the second driver substrate; and at least one switch that electrically connects or separates the first and second voltage input terminals.

In a second aspect of the present invention, the liquid crystal display of the first aspect is configured so that in each of the first and second driver substrates, the drive voltage is used to generate a grayscale voltage to be supplied to a pixel electrode.

In a third aspect of the present invention, the liquid crystal display of the first aspect is configured so that in each of the first and second driver substrates, the drive voltage is used to generate a retention capacitor line voltage to be supplied to a retention capacitor line forming a retention capacitor in combination with the pixel electrode.

In a fourth aspect of the present invention, the liquid crystal display of the first aspect is configured so that in each of the first and second driver substrates, the drive voltage is used to generate a common electrode voltage to be supplied to a common electrode forming a liquid crystal capacitor in combination with the pixel electrode.

In a fifth aspect of the present invention, the liquid crystal display of the first aspect is configured so that the first and second areas are arranged side by side along a direction in which data signal lines extend; and every one of the data signal lines passes through both the first and second areas and is driven by both the first and second driver substrates.

In a sixth aspect of the present invention, the liquid crystal display of the first aspect is configured to further include an evaluation circuit that evaluates whether or not the drive voltage supplied to the first voltage input terminal and the drive voltage supplied to the second voltage input terminal have a difference that is less than or equal to reference value.

In a seventh aspect of the present invention, the liquid crystal display of the sixth aspect is configured so that if the difference is less than or equal to the reference value, the evaluation circuit outputs a control signal that turns on the at least one switch, thereby electrically connecting the first and second voltage input terminals.

In an eighth aspect of the present invention, the liquid crystal display of the sixth aspect is configured so that the evaluation circuit evaluates whether or not both of the drive voltages exceed a threshold value.

In a ninth aspect of the present invention, the liquid crystal display of the eighth aspect is configured so that if the difference is less than or equal to the reference value, and both of the drive voltages exceed the threshold value, the evaluation circuit outputs a control signal that turns on the at least one switch, thereby electrically connecting the first and second voltage input terminals.

In a tenth aspect of the present invention, the liquid crystal display of the sixth aspect is configured so that if the difference exceeds the reference value for a predetermined period after power-on, the evaluation circuit outputs a malfunction alert.

In an eleventh aspect of the present invention, the liquid crystal display of the sixth aspect is configured so that each of the first- and second-driver-substrate-voltage generating circuits includes: a D/A conversion circuit that outputs a voltage corresponding to incoming digital data using the digital data and a reference voltage; and an amplifier that generates the associated one of the drive voltages using the voltage outputted from the D/A conversion circuit.

In a twelfth aspect of the present invention, the liquid crystal display of the eleventh aspect is configured to further include a controller that generates the digital data that is fed to the D/A conversion circuits in the first- and second-driver-substrate-voltage generating circuits.

In a thirteenth aspect of the present invention, the liquid crystal display of the twelfth aspect is configured so that the second-driver-substrate-voltage generating circuit further includes a digital correction circuit that corrects the digital data before the digital data is fed to the D/A conversion circuits.

In a fourteenth aspect of the present invention, the liquid crystal display of the eleventh aspect is configured so that each of the first- and second-driver-substrate-voltage generating circuits further includes an A/D conversion circuit that: converts the drive voltage generated by the associated one of the amplifiers to evaluation data; and feeds the evaluation data to the evaluation circuit.

In a fifteenth aspect of the present invention, the liquid crystal display of the sixth aspect is configured so that the reference value is set to less than or equal to 2% of a reference voltage.

In a sixteenth aspect of the present invention, the liquid crystal display of the seventh aspect is configured so that if both of the drive voltages exceed an upper limit voltage or a lower limit voltage that is obtained based on a reference voltage, the evaluation circuit does not output the control signal regardless of whether or not the difference is less than or equal to the reference value.

In a seventeenth aspect of the present invention, the liquid crystal display of the seventh aspect is configured so that the at least one switch includes a plurality of switches that are simultaneously turned on in response to the control signal.

In an eighteenth aspect of the present invention, the liquid crystal display of the first aspect is configured to further include a switch-toggling circuit that, in response to an user input (instruction), outputs a control signal that turns on the at least one switch.

In a nineteenth aspect of the present invention, the liquid crystal display of the first aspect is configured so that the at least one switch is a field effect transistor.

In a twentieth aspect of the present invention, the liquid crystal display of the first aspect is configured so that the at least one switch includes two switches one of which is provided on the first driver substrate and the other one of which is provided on the second driver substrate.

In a twenty-first aspect of the present invention, the liquid crystal display of the twelfth aspect is configured to further include a control hoard carrying thereon the controller, the first-driver-substrate-voltage generating circuit, and the evaluation circuit.

In a twenty-second aspect of the present invention, the liquid crystal display of any one of the first to twenty-first aspects is configured to further include: a power storage section; and a monitoring section that monitors a power supply voltage supplied to the liquid crystal display, wherein when the power supply voltage is abnormal, the monitoring section outputs a control signal that turns off the at least one switch by operating on an incoming power supply from the power storage section. The monitoring section and the power storage section may he provided inside the evaluation circuit or separately from the evaluation circuit.

The present invention is not limited to the embodiments and examples above. Proper variations and combinations of the embodiments and examples in view of general technical knowledge are encompassed in the technical scope of the present invention.

INDUSTRIAL APPLICABILITY

The liquid crystal display in accordance with the present invention is suitably applicable to large-sized liquid crystal displays.

REFERENCE SIGNS LIST

10: Liquid Crystal Display
15: DAC
16: Amplifier
17: ADC
DS: Display Section
ARa to ARd: Area
Fa to Fd: Driver Substrate
Pa to Pd: Voltage Generating Circuit
Ka to Kd: Control Board
CLa to CLd: Controller
J: Evaluation Circuit
SDa to SDd: Source Driver
GDi and GDj: Gate Driver
CDa to CDd: CS Driver
a1 to a6, A1 to A6: Switch
b1 to b6, B1 to B6: Switch
c1 to c6, C1 to C6: Switch
d1 to d6, D1 to D6: Switch
xa1: First Voltage Input Terminal
xb1: Second Voltage Input Terminal
L: Link Wire
U: User Input Section
H: Switching Circuit

The invention claimed is:

1. A liquid crystal display comprising:
a display section including first and second areas;
a first driver substrate for the first area;
a second driver substrate for the second area;
a first-driver-substrate-voltage generating circuit that supplies a drive voltage to a first voltage input terminal of the first driver substrate;
a second-driver-substrate-voltage generating circuit that supplies a drive voltage to a second voltage input terminal of the second driver substrate; and
at least one switch that electrically connects or separates the first and second voltage input terminals, further comprising
an evaluation circuit that evaluates whether or not the drive voltage supplied to the first voltage input terminal and the drive voltage supplied to the second voltage input terminal have a difference that is less than or equal to a reference value.

2. The liquid crystal display according to claim 1, wherein in each of the first and second driver substrates, the drive voltage is used to generate a grayscale voltage to be supplied to a pixel electrode.

3. The liquid crystal display according to claim 1, wherein in each of the first and second driver substrates, the drive voltage is used to generate a retention capacitor line voltage to be supplied to a retention capacitor line forming a retention capacitor in combination with the pixel electrode.

4. The liquid crystal display according to claim 1, wherein in each of the first and second driver substrates, the drive voltage is used to generate a common electrode voltage to be supplied to a common electrode forming a liquid crystal capacitor in combination with the pixel electrode.

5. The liquid crystal display according to claim 1, wherein:
the first and second areas are arranged side by side along a direction in which data signal lines extend; and
every one of the data signal lines passes through both the first and second areas and is driven by both the first and second driver substrates.

6. The liquid crystal display according to claim 1, wherein if the difference is less than or equal to the reference value, the evaluation circuit outputs a control signal that turns on the at least one switch, thereby electrically connecting the first and second voltage input terminals.

7. The liquid crystal display according to claim 6, wherein if both of the drive voltages exceed an upper limit voltage or a lower limit voltage that is obtained based on a reference voltage, the evaluation circuit does not output the control signal regardless of whether or not the difference is less than or equal to the reference value.

8. The liquid crystal display according to claim 6, wherein the at least one switch comprises a plurality of switches that are simultaneously turned on in response to the control signal.

9. The liquid crystal display according to claim 1, wherein the evaluation circuit evaluates whether or not both of the drive voltages exceed a threshold value.

10. The liquid crystal display according to claim 9, wherein if the difference is less than or equal to the reference value, and both of the drive voltages exceed the threshold value, the evaluation circuit outputs a control signal that turns on the at least one switch, thereby electrically connecting the first and second voltage input terminals.

11. The liquid crystal display according to claim 1, wherein if the difference exceeds the reference value for a predetermined period after power-on, the evaluation circuit outputs a malfunction alert.

12. The liquid crystal display according to claim 1, wherein each of the first- and second-driver-substrate-voltage generating circuits comprises: a D/A conversion circuit that outputs a voltage corresponding to incoming digital data using the digital data and a reference voltage; and an amplifier that generates the associated one of the drive voltages using the voltage outputted from the D/A conversion circuit.

13. The liquid crystal display according to claim 12, further comprising a controller that generates the digital data that is fed to the D/A conversion circuits in the first- and second-driver-substrate-voltage generating circuits.

14. The liquid crystal display according to claim 13, further comprising a control board carrying thereon the controller, the first-driver-substrate-voltage generating circuit, and the evaluation circuit.

15. The liquid crystal display according to claim 12, wherein each of the first- and second-driver-substrate-voltage generating circuits further comprises an A/D conversion circuit that: converts the drive voltage generated by the associated one of the amplifiers to evaluation data; and feeds the evaluation data to the evaluation circuit.

16. The liquid crystal display according to claim 1, further comprising a switching circuit that, in response to an user input, outputs a control signal that turns on the at least one switch.

17. The liquid crystal display according to claim 1, wherein the at least one switch is a field effect transistor.

18. The liquid crystal display according to claim 1, wherein the at least one switch comprises two switches one of which is provided on the first driver substrate and the other one of which is provided on the second driver substrate.

19. The liquid crystal display according to claim 1, further comprising:
a power storage section; and
a monitoring section that monitors a power supply voltage supplied to the liquid crystal display,
wherein when the power supply voltage is abnormal, the monitoring section outputs a control signal that turns off the at least one switch by operating on an incoming power supply from the power storage section.

* * * * *